United States Patent Office 3,226,580
Patented Dec. 28, 1965.

3,226,580
FLUID-COOLED ROTATING MACHINES, PARTICULARLY ELECTRIC MOTORS AND GENERATORS
Karl-Heinz Oehlrich and Aribert Fracke, Erlangen, Germany, assignors to Siemens-Schuckertwerke Aktiengesellschaft, Berlin-Siemensstadt, Germany, a corporation of Germany
Filed July 27, 1961, Ser. No. 127,223
Claims priority, application Germany, Aug. 3, 1960, S 69,755
7 Claims. (Cl. 310—57)

Our invention relates to fluid-cooled rotating machines, particularly electric motors and generators, in which the cooling of the machine is effected by turbulent flow of fluid, preferably air, which is caused to travel in a circulatory flow that has potential-flow and rotational-flow components and passes over a solid or rough ground in the fluid-technological sense so as to develop vortex sources and vortex sinks (these phenomena and terms being explained, for example, in the copending applications of K. Oehlrich et al., Serial No. 835,886, filed August 25, 1959 and K. Oehlrich, Serial No. 98,604, filed March 27, 1961 and K. Schmidt, Serial No. 128,431, filed August 1, 1961 all assigned to the assignee of the present invention). More particularly, our invention relates to fluid-cooled machines whose housing structure, preferably the bearing shields in which the machine shaft is journalled, are penetrated by heat-transfer bodies of copper, aluminum or the like metal of good thermal conductitvity, and these bodies are provided, particularly at the inner side thereof, with profiles, ribs or other surface irregularities or "roughness." In such devices, the heat-conducting insert bodies are contacted at the inner side by the inner current of cooling air and conduct the heat, taken from this air, to the outer side of the housing structure where it is imparted to an outer current of air continuously blown along the housing surface.

Relating to fluid-cooled machines generally of the above-mentioned type, it is an object of our invention to greatly improve the dissipation of heat from the heat-transfer bodies that penetrate the housing structure, so that a greater heat quantity per unit of time or per given volume is conveyed to the ambient air.

To this end, and in accordance with our invention, we connect the heat-conducting bodies that penetrate the housing structure of the machine on the upstream side of the outer current of cooling air by good heat-conducting means with one or more heat-transfer bodies, also of good heat-conducting metal, which penetrate the housing structure on the downstream side thereof. Preferably, in a rotating electric machine such as a motor or generator, the above-mentioned heat-transfer bodies are located in openings of the two bearing shields that are located on the upstream side, i.e. the axial end of the machine where the air impeller is located, on the one hand, and on the downstream end of the machine where the heated flow of air is distributed to the ambient air, and the heat-transfer bodies in the respective shields are heat-conductively interconnected by structure located on the outer surface of the cylindrical housing portion of the machine to be exposed to the flow of coolant air passing along and/or about the housing.

According to another, more specific feature of our invention, the good heat-conducting connection between the bodies that transfer heat from the internal space of the machine to the outside of the housing structure at the upstream end and downstream end respectively, is effected by a jacket of good heat-conducting metal which is intimately joined with the housing proper. Such jacket preferably consists of aluminum with which the machine housing, consisting for example of iron, is piated or coated. However the interconnecting structure of good heat-conducting metal may also consist of bridge pieces that extend longitudinally of the machine in intimate contact with the machine housing from one axial end of the machine to the other. These bridge pieces, consisting of aluminum or copper for example, preferably extend longitudinally between the cooling vanes which in many cases form an integral part of the iron structure of the machine housing.

According to another feature of our invention we provide the machine with one or more slit-nozzle structures which have annular shape and concentrically surround the machine housing. The annular slit nozzles are located between the axial ends of the machine in axially spaced relation thereto and are designed to guide the air flow from the upstream or impeller side of the machine back toward the housing. We further provide such a machine with at least one hood member at the downstream side of the machine which forms an angular interspace with the machine housing or the above-mentioned jacket for guiding the air flow from the peripheral area of the housing toward the center and thence to the ambient air. This hood member is preferably provided with fixed guiding vanes.

According to another feature of our invention the above-mentioned jacket or other thermal connecting structures are provided with ribs or other surface irregularities so as to constitute a rough ground which promotes the desired turbulence of the air flow.

By virtue of the above-mentioned features, the heat-transfer bodies that extend from the inside to the outside of the machine dissipate heat to the outer air current as well as by heat conductance to the jacket or other heat-conducting structures on the machine housing. This jacket or structure, in turn, dissipates its heat to the same outer air current. Since the housing of electric machines, as a rule, consists of iron or other metal having relatively poor heat-conducting properties, the above-mentioned aluminum jacket also improves the heat dissipation from the entire housing to the outer current of cooling air and thus to the ambient air.

It is known for miniature motors to make the bearing shields of aluminum which secures sufficient mechanical strength as well as satisfactory heat conductance. With electric motors and generators of medium and large power ratings, however, the strength of a housing of aluminum is insufficient. Our invention therefore constitutes a considerable improvement particularly with respect to such larger machines whose housing consists of cast-iron or steel castings. Such housings can readily be plated with a good heat-conducting and fast-adhering coating of aluminum. The coated jacket of aluminum can be provided with longitudinal slots in order to compensate the differences in thermal elongation between the cast-iron or steel on the one hand and the aluminum on the other hand.

The cooling of the heat-conducting jacket and of the bridge members extending between the ribs is improved by one or more of the above-mentioned ring-shaped nozzle members that surround the housing structure of the machine. Such nozzle members increase the velocity of the outer flow of cooling air in the axial direction. This has the result that by means of the invention the length of the machine that can thus be subjected to effective cooling can be considerably increased by relatively simple means.

By providing a plurality of such ring-shaped nozzle members, the flow of cooling air which tends to spread away from the machine is repeatedly and in respective steps subjected to contraction and is thus forced to flow against the jacket or housing surface to be cooled. In this manner, the current of cooling air is guided by the ring-shaped nozzles in a relatively compact form to the downstream side of the machine where the above-mentioned hood member guides the flow in a radially inward direction. The above-mentioned guiding vanes in the interior of the hood member extend radially in order to produce a potential flow at the downstream end portion of the path. Such cooling by ring-shaped nozzles, as compared with the provision of a conventional cooling jacket that guides the cooling air at the outer side of the housing within an enclosed jacket space, has the advantage of considerably lesser friction because a friction-free zone is located between each two of the ring-shaped nozzles. This contributes to affording the greatly increased coolable length of the machine mentioned above.

It is preferable to provide a suction disc with radially extending profiles, such as ridges or grooves, on the downstream side of the machine where the cooling air leaves the above-mentioned hood member. The suction disc, mounted on the machine shaft and rotating during operation, additionally produces a rotational flow of the fluid where it leaves the cooling path proper. In this manner, a negative-pressure profile or zone is superimposed upon the positive-pressure (back-pressure) zone which becomes built up behind the bearing shield, so that the cooling flow, extending radially inwardly, is removed in the axial direction toward the rotating suction disc which distributes it radially outwardly to the ambient air.

According to still another feature of our invention, the heat-transfer bodies which extend from the inside to the outside of the machine housing structure, preferably at the bearing shields, are provided with radial ribs or ridges at localities where the speed of the air flow has a predominant peripheral component, whereas the corresponding heat-transfer bodies at locations with a predominant radial speed component of the air flow are given arcuate ribs, in order to obtain in each case a reliable tearing apart of the heat-insulating boundary layer that may be formed in the air flow.

If the machine housing has cooling ribs or vanes extending in the axial direction, then the cooling air at the upstream side first flows radially outwardly, thence in the axial direction between the cooling ribs toward the downstream side of the machine, where the air, guided by the guiding vanes in the downstream hood member is constrained to flow in the peripheral direction before the air is being dissipated to the ambient atmosphere by the rotating suction disc. In such a machine the ribs or ridges at the heat-conducting bodies always extend substantially at a right angle to the flow direction of the cooling air, that is, in the peripheral direction at the upstream side but in the radial direction at the downstream side.

The heat-transfer bodies that penetrate the machine housing are preferably given a streamlined design and provided with grooves and baffle faces, particularly on their downstream side. The coating or jacket of good conducting material with which the cylindrical housing portion is equipped is preferably provided with grooves or ridges transverse of the flow direction for increasing the heat-dissipating surface. For securing a good heat transfer between the good heat-conducting layers of the cylindrical housing portion and the heat-transfer bodies, they are connected with each other by flanges. These flanges may be given enlarged mutually engaging surfaces, for example in zigzag shape.

Furthermore, in lieu of, or in addition to, the above-mentioned ring-shaped nozzle members, an external envelope may be provided for guiding or generally confining the flow of cooling air. This outer envelope preferably forms an extension of the hood member on the downstream side of the machine and has a conical shape that widens toward the upstream side at an angle of about 8 to 16° in order to reduce the frictional flow resistances.

The invention will be further described with reference to the embodiments of air-cooled machines according to the invention illustrated by way of example on the accompanying drawings in which.

Figure 1:
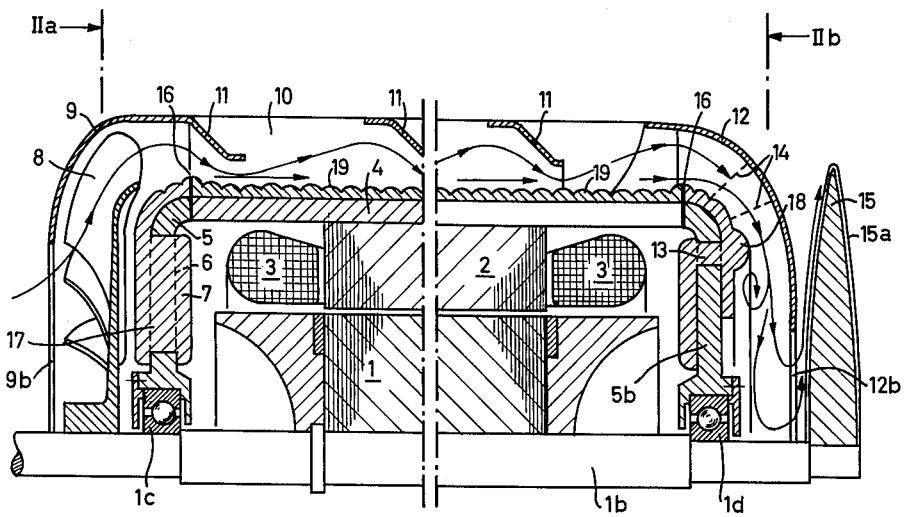
FIG. 1 is an axial section of a dynamoelectric machine according to the invention.
Figures 2A, 2B:
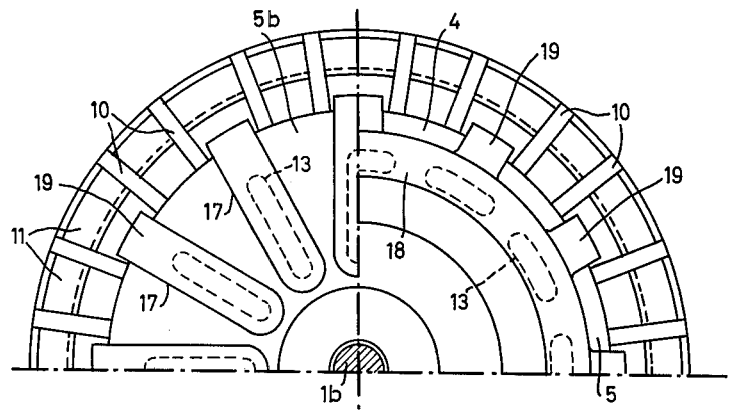
FIG. 2a shows one quadrant of a side elevation viewed onto the plane denoted by the line IIa in FIG. 1, some parts of the machine being removed in order to prevent obscuring others.
FIG. 2b shows a quadrant of another side elevation viewed onto the plane denoted by the line IIb in FIG. 1, also with some parts removed to prevent obscuring others.

The machine according to FIGS. 1, 2a and 2b comprises a laminated rotor 1 mounted on a shaft 1b and rotatable within a laminated stator 2 which is provided with stator windings whose end turns appear at 3. The stator is mounted in a cylindrical housing structure 4 of iron or steel whose axial ends are closed by respective bearing shields 5 and 5b also of iron or steel. The machine shaft 1b is journalled in ball bearings 1c and 1d mounted in the respective shields 5 and 5b. The two bearing shields are provided with openings. Located in the openings 6 of bearing shield 5 are respective heat-transfer bodies 7 of copper or aluminum. Each of these bodies has a relatively large internal surface in contact with the enclosed air in order to receive heat therefrom, and also has a large external surface to dissipate the heat to an outer flow of cooling air.

The cylindrical portion 4 of the housing structure is provided with a structure 19 of good heat-conducting metal such as aluminum or copper which is intimately joined with the housing 4. Referring only to FIG. 1, it will be understood that the structure 19 may consist of a jacket which fully encloses the housing 4. In this case, the jacket 19 preferably consists of aluminum and is preferably plated or otherwise coated upon the housing. The heat-transfer bodies 7 are in good heat-conducting contact with the jacket 19. The connection is formed by flanges 16. The jacket 19 as well as part of the heat-transfer bodies 7 are provided with ribs or ridges that extend transversely of the machine axis. As shown in FIGS. 2a and 2b and more fully described below, the structure 19 may also consist of a multiplicity of connecting bars serving the same purpose as the jacket.

An air impeller wheel 8 is mounted on the machine shaft 1b within an air-guiding hood member 9 which surrounds the adjacent end portion of the machine housing and has a large central opening 9d through which the impeller 8, during operation of the machine, inducts cooling air from the ambient atmosphere and passes it along the peripherally outer portion of the heat-transfer bodies 7 and thence along the jacket 19 of the machine housing. The hood 9 is joined with a ring-shaped nozzle member 11 which has an opening that concentrically surrounds the jacket 19 and is radially spaced therefrom so as to cause contraction of the air current. The air current, which tends to widen as it passes from the impeller through the hood member 9, thus is caught by nozzle member 11 and is forced against the jacket 19. Additional ring-nozzle members 11 of the same design and operation are provided along the axial extent of the machine housing in concentric relation thereto and axially spaced from each other. As a result, the air current which, after being forced against the jacket by each ring nozzle, again tends to become widened, is caught by the next following ring nozzle and again forced toward the jacket, until it reaches another hood member 12 at the downstream end of the housing where the air flow is caught and guided radially inwardly to pass out of a relatively large central opening 12b of hood 12.

Further heat-transfer bodies 13 are provided in bearing shield 5b on the downstream side of the machine in the same manner as described above with respect to the bodies 7 in shield 5. The bodies 13 are connected by flanges 16 with the jacket 19. Mounted in the flow-guiding hood 12 are fixed radial guiding vanes 14 which impress a potential flow upon the current of cooling air. A suction disc 15 with radial grooves or ridges or the like profiles 15a is mounted on the machine shaft 1b at the downstream side of the machine in order to produce radial Coriolis and centrifugal forces that fling the heated air, issuing from opening 12, outwardly into the ambient atmosphere.

According to FIGS. 2a and 2b the machine housing 4 is not entirely covered by a jacket but is provided with bridging structures or bars 19 that are intimately bonded to the housing 4 and form a good heat-conducting connection with the heat-transfer bodies 7 in the bearing shield 5 (FIG. 2a) and the corresponding bodies 13 in the bearing shield 5b (FIG. 2b).

The heat-transfer bodies 7 at the upstream side (FIG. 2a) are provided with a protruding portion or bulge profile 18 of circular shape (FIGS. 1, 2a) extending in concentric relation to the machine axis. At the downstream side, however, the corresponding heat-transfer bodies 13 are provided with protruding portions or ridge profiles 17 (FIGS. 1, 2b) which extend in the radial direction. This particular machine has its housing 4 provided with integral cooling vanes 10 that extend in radial planes parallel to the axis. The heat-conducting bridge structures 19 of aluminum or copper are disposed between the vanes 10. The ring nozzles 11 (FIGS. 1, 2b) are fastened to the vanes. It should be understood that the vanes 10 may be omitted. In the latter case the thermally conductive structures 19 preferably consist of the above-mentioned jacket, and the ring nozzles are then fastened to the machine housing by other means such as spacer brackets.

Figure 3:
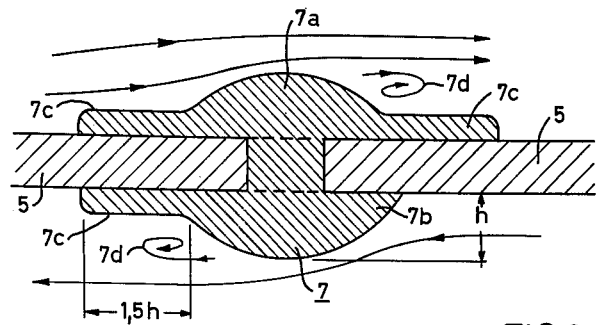
FIG. 3 is a sectional view of one of the heat-transfer bodies in somewhat modified form.

FIG. 3 shows a modified form of a heat-transfer body 7 whose outer portion 7a is designed for a coolant flow from two directions, whereas the inner side 7b is designed for a coolant flow in only one given direction. The bearing shield in FIG. 3 is denoted by 5 and corresponds to the shield 5 in FIGS. 1, 2a. At its inner side 7b, the heat-transfer body 7 of FIG. 3 is subjected to a flow of coolant in the direction of the arrow A and is provided with run-off faces 7c on the downstream side where vortexes 7d are formed for breaking the boundary layer to secure an optimal heat transfer from the flow of coolant to the heat-transfer body 7. The outer portion of the body 7 has two run-off faces 7c along which corresponding vortexes 7d can form in order to secure a good heat transfer to the outer flow of cooling air. If the thickness of the boundary-layer flow is designated by $h$, the length of the run-off face should be approximately equal to 1.5 h.

Figure 4:
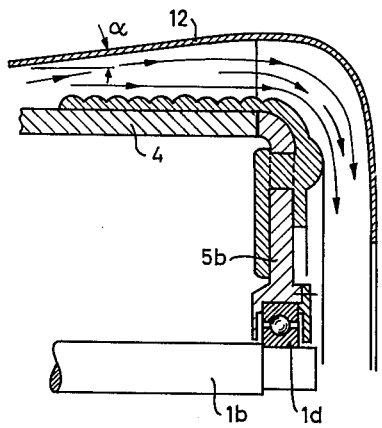
FIG. 4 shows a modified portion of the machine according to FIG. 1, the modification relating to the downstream end of the machine with respect to the flow of cooling air.

In addition to the ring nozzles 11 described above with reference to FIG. 1, the flow-guiding hood 12 can further be given an extension 12b as shown in FIG. 4. The extension surrounds the downstream end portion of the electric machine and thus forms an outer enclosure which tapers toward the upstream end of the machine and has a conical shape at an angle of about 8 to 16°. Such a device is particularly advantageous for electric motors and generators of relatively small axial length.

Figure 5:
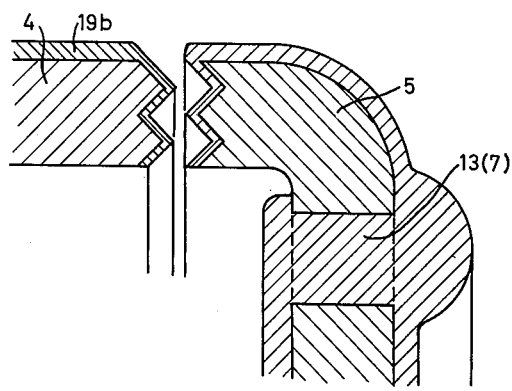
FIG. 5 is a sectional view of another modification relating to a flange connection between the cylindrical portion and bearing shield of a machine otherwise according to FIG. 1.

FIG. 5 illustrates an example for a good heat-conducting connection between the plated jacket 19b of the machine housing 4 consisting of cast-iron or steel, and the heat-transfer bodies 7 or 13 consisting of aluminum or the like light metal in the bearing shield 5 or 5b. The flange connection comprises mutually engaging surfaces of zigzag shape for increasing the heat transfer.

We claim:
1. A rotating electric machine comprising a housing having an enclosed machine space, heat-transfer bodies of good heat-conducting metal penetrating said housing and having heat-exchanging surfaces at the inside and at the outside of said housing to conduct heat from said enclosed space to the outside of said housing, gaseous-coolant supply means for passing a flow of coolant along said housing on the outside thereof, said heat-transfer bodies being mounted on the upstream side and downstream side respectively of said housing relative to the coolant flow, structure of good heat-conducting metal extending along said housing and conductively connecting said heat-transfer bodies on the upstream side with those on the downstream side, said structure being joined with said housing and located on the outside thereof to be exposed to the coolant flow, and a plurality of ring-shaped slot-nozzle means coaxially surrounding said housing with radial clearance and having a shape tapering in the coolant-flow direction for guiding the coolant toward said housing and structure, said nozzle means being axially spaced from each other downstream of said coolant supply means ahead of the downstream end of the housing, and a hood member adjacent to and spaced from said latter end to form an interspace with said housing, said hood member having an annular air inlet opening for receiving the air flow and having a lateral opening for deflecting the flow axially inward and then out of said lateral opening, said bodies and said structure having protruding ridges transverse to the coolant flow direction and exposed to said flow to promote turbulence.

2. A rotating electric machine comprising a housing having an enclosed machine space, substantially massive bodies of good heat-conducting metal penetrating said housing and having heat-exchanging surfaces at the inside and at the outside of said housing to conduct heat from said enclosed space to the outside of said housing, an outer jacket of good heat-conducting metal intimately joined with said housing, said jacket being in heat-conducting connection with said bodies to receive heat therefrom, two hood members adjacent to and spaced from said housing at opposite ends thereof and spaced from each other, said hood members forming respective interspaces with said jacketed housing for the passage of gaseous coolant and having respective openings to form a coolant inlet and outlet respectively, gas impeller means near one of said openings for passing coolant through said interspaces and along said jacket, and a plurality of ring-shaped slot-nozzle means axially spaced from each other and surrounding said jacketed housing between said two hood members for guiding the fluid flow toward said jacket, said bodies and said jacket having a multiplicity of ridges transverse to the coolant flow direction and exposed to the flow for promoting turbulence.

3. A rotating electric machine having a substantially cylindrical housing and having respective bearing shields at the two ends of said housing, said housing and shields enclosing an inner machine space, said shields having respective openings, heat-transfer bodies of good heat-conducting metal filling said respective openings and having heat-exchanging surfaces at the inside and at the outside of the bearing shields to conduct heat from said enclosed space to the outside of said housing, an outer jacket of good heat-conducting metal intimately joined with said housing, said jacket being in heat-conducting connection with said bodies to receive heat therefrom, two ring-shaped hood members axially spaced from each other and mounted near but in spaced relation to the respective axial ends of said housing, said hood members having respective lateral air openings, an air impeller rotatably mounted between one of said hood members and one of said shields, and a plurality of ring-shaped slot-nozzle means axially spaced from each other and from said impeller and surrounding said jacketed housing with radial clearance between said two hood members for guiding the air flow, said bodies and said jacket having a multiplicity of ridges transverse to the coolant flow direction and exposed to the flow for promoting turbulence.

4. An electric machine according to claim 3, comprising a machine shaft coaxially traversing said housing and bearing shields, and a suction disc mounted on said shaft outside said housing and hood member at the downstream side of said air flow, said disc having radial profiles for radially forcing the air away from the opening of said hood member.

5. In an electric machine according to claim 3, said bodies on the one shield near said impeller, where the air flow has a predominant peripheral component, having bulges extending radially, and said bodies on the other shield, where the air flow has a predominant radial component, having protruding bulges of arcuate shape concentric to the machine axis.

6. In an electric machine according to claim 3, said hood member at the downstream side of the air flow having a conical extension which surrounds part of the peripheral portion of said housing and forms an outer enclosure for the flow of cooling air, said conical extension tapering toward the other hood member at an angle of about 8 to 16°.

7. A rotating electric machine having a substantially cylindrical housing of iron and having respective bearing shields of iron at the two ends of said housing, said housing and shields enclosing an inner machine space, said shields having respective openings, heat-transfer bodies of good heat-conducting metal filling said respective openings and having heat-exchanging surfaces at the inside and at the outside of the bearing shields to conduct heat from said enclosed space to the outside of said housing, structure of good heat-conducting metal joined with said housing at the outer side thereof and conductively interconnecting said bodies of said respective shields, air impeller means for passing coolant air over and along said housing, a flow-guiding hood member surrounding said housing with clearance at the downstream side of the air flow, and a plurality of ring-shaped slot-nozzle means axially spaced from each other and surrounding said housing and structure with radial clearance ahead of said hood member for guiding the air flow against said housing and structure, said bodies and said structure having protruding ridges transverse to the coolant flow direction and exposed to said flow to promote turbulence.

References Cited by the Examiner
UNITED STATES PATENTS

| | | | |
|---|---|---|---|
| 1,762,455 | 6/1930 | Preedit | 310—57 |
| 2,458,010 | 1/1949 | Ludwig | 310—57 |
| 2,515,973 | 7/1950 | Abbott | 310—57 |
| 2,785,325 | 3/1957 | Keyner | 310—57 X |

FOREIGN PATENTS 1,114,565   12/1955   France.

ORIS L. RADER, *Primary Examiner.*

DAVID X. SLINEY, MILTON O. HIRSHFIELD,
*Examiners.*